(12) United States Patent
Huang

(10) Patent No.: US 10,295,800 B2
(45) Date of Patent: May 21, 2019

(54) OPTICAL LENS

(71) Applicant: ABILITY ENTERPRISE CO., LTD., New Taipei (TW)

(72) Inventor: Huai-Yi Huang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 14/818,947

(22) Filed: Aug. 5, 2015

(65) Prior Publication Data
US 2016/0062078 A1    Mar. 3, 2016

(30) Foreign Application Priority Data
Aug. 27, 2014  (TW) .............................. 103129505 A

(51) Int. Cl.
*G02B 13/04* (2006.01)
*G02B 13/18* (2006.01)
*G02B 9/34* (2006.01)

(52) U.S. Cl.
CPC ............... *G02B 13/18* (2013.01); *G02B 9/34* (2013.01); *G02B 13/04* (2013.01)

(58) Field of Classification Search
CPC . G02B 13/04; G02B 9/34; G02B 9/58; G02B 9/60; G02B 13/18; G02B 13/06; G02B 9/62; G02B 9/64
USPC .................. 359/749–753, 761, 770, 713–714
See application file for complete search history.

(56) References Cited

U.S. PATENT DOCUMENTS

| | | | | |
|---|---|---|---|---|
| 4,116,536 A | * | 9/1978 | Moscovich | ............ G02B 13/04 359/749 |
| 5,087,989 A | * | 2/1992 | Igarashi | ................... G02B 9/34 359/691 |
| 5,541,772 A | * | 7/1996 | Lin | ....................... G02B 15/161 359/692 |
| 5,541,773 A | | 7/1996 | Kamo et al. | |
| 5,663,838 A | | 9/1997 | Hasushita et al. | |
| 7,684,127 B2 | | 3/2010 | Asami | |
| 8,243,129 B2 | | 8/2012 | Uzawa | |
| 8,289,628 B2 | | 10/2012 | Asami | |
| 8,654,457 B2 | | 2/2014 | Jin et al. | |
| 8,743,485 B2 | | 6/2014 | Hsieh et al. | |
| 9,261,680 B2 | | 2/2016 | Lin | |
| 9,618,731 B2 | * | 4/2017 | Ikegaya | ................. G02B 13/04 |

(Continued)

FOREIGN PATENT DOCUMENTS

| | | |
|---|---|---|
| CN | 101339288 A | 1/2009 |
| CN | 102414597 A | 4/2012 |

(Continued)

OTHER PUBLICATIONS

Chinese Office Action dated May 24, 2017.
Taiwanese Office Action dated Nov. 23, 2017.

*Primary Examiner* — Jordan M Schwartz
(74) *Attorney, Agent, or Firm* — Rabin & Berdo, P.C.

(57) ABSTRACT

An embodiment of this disclosure provides an optical lens, which includes, in order from an object side to an image-forming side, a first lens with negative refraction power; a second lens with negative refraction power; a third lens with positive refraction power; a fourth lens with positive refraction power; and a fifth lens with negative refraction power; wherein the second lens has an Abbe number vd2, the fifth lens has a refractive index nd5, and $20 \leq vd2 \leq 30$ and $nd5 \geq 1.9$.

20 Claims, 6 Drawing Sheets

(56) References Cited

U.S. PATENT DOCUMENTS

| | | | | |
|---|---|---|---|---|
| 2008/0174887 A1* | 7/2008 | Asami | G02B 13/06 |
| | | | 359/761 |
| 2009/0009888 A1* | 1/2009 | Asami | G02B 9/34 |
| | | | 359/770 |
| 2009/0237807 A1* | 9/2009 | Sasamoto | G02B 23/243 |
| | | | 359/691 |
| 2010/0254025 A1* | 10/2010 | Yoshida | G02B 9/60 |
| | | | 359/717 |
| 2010/0284095 A1* | 11/2010 | Lin | G02B 13/06 |
| | | | 359/794 |
| 2011/0316969 A1* | 12/2011 | Hsieh | G02B 13/06 |
| | | | 348/36 |
| 2012/0007972 A1* | 1/2012 | Uzawa | A61B 1/00096 |
| | | | 348/65 |
| 2012/0056978 A1* | 3/2012 | Abe | G02B 13/06 |
| | | | 348/36 |
| 2012/0170142 A1* | 7/2012 | Hsieh | G02B 9/62 |
| | | | 359/762 |
| 2012/0275034 A1* | 11/2012 | Lee | G02B 15/177 |
| | | | 359/682 |
| 2014/0071333 A1* | 3/2014 | Kanetaka | G02B 9/34 |
| | | | 348/360 |
| 2014/0118846 A1 | 5/2014 | Kubota et al. | |
| 2014/0268367 A1* | 9/2014 | Kawamura | G02B 13/04 |
| | | | 359/708 |
| 2014/0268369 A1* | 9/2014 | Chen | G02B 9/60 |
| | | | 359/715 |
| 2015/0168693 A1* | 6/2015 | Sun | G02B 13/04 |
| | | | 359/751 |
| 2015/0331224 A1* | 11/2015 | Shih | G02B 9/62 |
| | | | 359/756 |

FOREIGN PATENT DOCUMENTS

| | | |
|---|---|---|
| CN | 103926674 A | 7/2014 |
| EP | 2402808 A1 | 1/2012 |
| JP | H07-281089 A | 10/1995 |
| JP | H11-084236 A | 3/1999 |
| JP | 3253405 B2 | 2/2002 |
| JP | 3365835 B2 | 1/2003 |
| JP | 2009-31762 A | 2/2009 |
| JP | 2009-145809 A | 7/2009 |
| JP | 2009-223251 A | 10/2009 |
| TW | 201241498 A | 10/2012 |
| TW | M472853 U | 2/2014 |

* cited by examiner

OPTICAL LENS

This application claims the benefit of Taiwan application Serial No. 103129505, filed Aug. 27, 2014, the subject matter of which is incorporated herein by reference.

BACKGROUND OF THE INVENTION

Field of the Invention

The invention relates in general to an optical lens and more particularly to an optical lens having wide angle and excellent imaging quality.

Description of the Related Art

Currently, the camera system mainly includes an optical lens and an image sensing module. The optical lens gathers the rays on the image sensing module, which further converts the gathered rays into image electronic signals. Then, the image electronic signals are stored, processed and transmitted.

The optical lens of the camera system is normally formed of several lenses. In order to increase product competiveness, it has always been a pursuit in product development to achieve wide angle, increase imaging quality and reduce manufacturing cost.

Therefore, it has become a prominent task for the industries to provide a new type of optical lens capable of reducing manufacturing cost and at the same time achieving wide angle and increasing imaging quality.

SUMMARY OF THE INVENTION

The invention is directed to an optical lens. Under the premise that imaging quality is excellent, the optical lens achieves wide-angle at the same time.

According to one embodiment of the present invention, an optical lens is provided. The optical lens, in order from an object side to an image-forming side, includes a first lens with negative refraction power, a second lens with negative refraction power, a third lens with positive refraction power, a fourth lens with positive refraction power, and a fifth lens with negative refraction power, wherein the second lens has an Abbe number $vd2$, the fifth lens has a refractive index $nd5$, and $20 \leq vd2 \leq 30$, $nd5 \geq 1.9$.

According to another embodiment of the present invention, an optical lens is provided. The optical lens, in order from an object side to an image-forming side, includes: a first lens with negative refraction power, a second lens with refraction power, a third lens with refraction power, a fourth lens with positive refraction power, and a fifth lens with negative refraction power, wherein a thickness of the third lens is larger than 3 millimeters (mm), the second lens has an Abbe number $vd2$, and $10 \leq vd2 \leq 50$.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
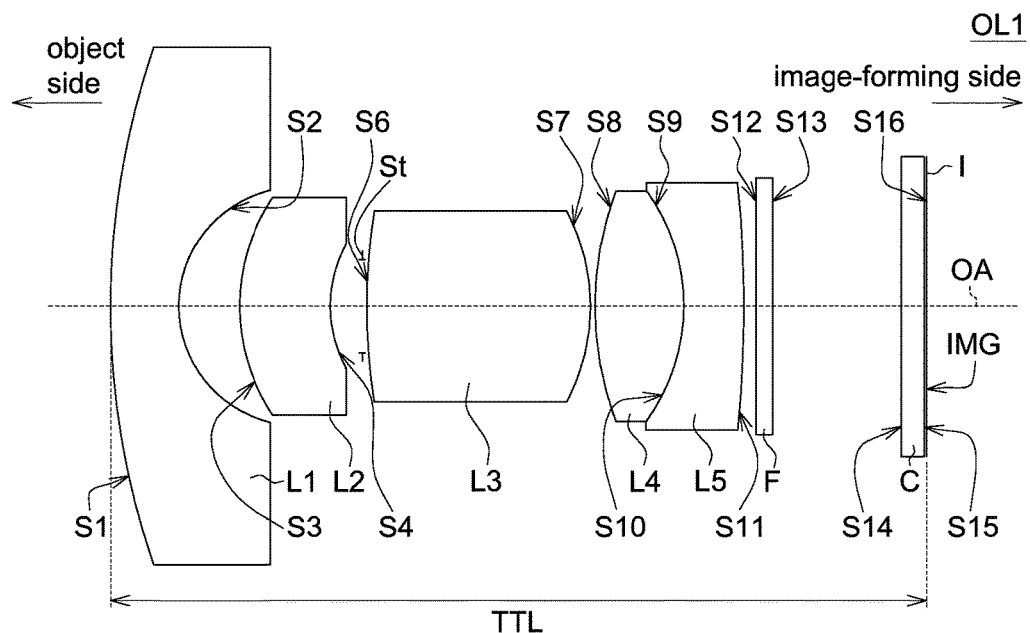
FIG. 1 is a schematic diagram of an optical lens according to an embodiment of the present disclosure.

Each embodiment of the present disclosure is elaborated with accompanying drawings. Apart from detailed descriptions of the embodiments, the invention can further be widely implemented in other embodiments, and any simply replacements, modifications and equivalent changes of the disclosed embodiments are included in the scope of protection of the present disclosure, and the scope of claims disclosed below shall prevail. In the specification, many specific details are provided for the readers to gain a better understanding of the invention. However, although some or all of the specific details are omitted, the invention still can be implemented. Besides, the generally-known steps or elements are not described in the details to avoid avoid creating unnecessary restrictions to the invention. For identical or similar similar elements in the drawings, the same or similar reference numerals are used. It should be noted that the drawings are for exemplary and explanatory purposes only, and do not represent actual dimensions or quantities of the elements unless they are specifically explained.

FIG. 1 is a schematic diagram of an optical lens according to an embodiment of the present disclosure OL1. To highlight the features of the present embodiment, only the structure related to the present embodiment is illustrated, and other structures are omitted. The optical lens OL1 of the present embodiment can be a wide-angle lens which has a horizontal angle larger than 180° and can be used in handheld communication systems, digital cameras, digital cameras, steam locomotives, monitors or motion devices. In addition, the optical lens OL1 of the present embodiment can also be realized by a fixed focal lens.

As indicated in FIG. 1, the optical lens OL1 of the present embodiment, in order from an object side to an image-forming side, includes a first lens L1 with negative refraction power, a second L2 lens with negative refraction power, a third lens L3 with positive refraction power, a fourth lens L4 with positive refraction power, and a fifth lens L5 with negative refraction power.

In a specific embodiment, the second lens L2 has an Abbe number vd2, which satisfies the condition: vd2≤50, but the present disclosure is not limited thereto.

In another embodiment, the Abbe number vd2 of the second lens L2 satisfies the condition: 10≤vd2≤50. In another embodiment, the Abbe number vd2 of the second lens L2 substantially satisfies the condition: 20≤vd2≤30.

Moreover, the second lens L2 further has a refractive index nd2. In a specific embodiment, nd2 satisfies the condition: nd2≥1.6. In another embodiment, nd2 further satisfies the condition: 2.2≥nd2≥1.6.

In another specific embodiment, the third lens L3 has a refractive index nd3, which satisfies the condition: nd3≥1.8. In another embodiment, nd3 further satisfies the condition: 2.2≥nd3≥1.8.

In addition, in an embodiment, a thickness of the third lens L3 is larger than 3 millimeters (mm). In another embodiment, the thickness of the third lens L3 is between 3 mm and 6 mm.

In another embodiment, the fifth lens L5 has a refractive index nd5, which satisfies the condition: nd5≥1.9. In another embodiment, nd5 further satisfies the condition: 2.2≥nd5≥1.9.

In an alternate embodiment, the fifth lens L5 can be formed of a high dispersion material. Specifically, the fifth lens L5 further has an Abbe number vd5, which satisfies the condition: 15≤vd5≤25.

As indicated in FIG. 1, the optical lens OL1 can further include a stop St and a filter F. The stop St can be disposed between the second lens L2 and the third lens L3 for limiting the flux of the rays. The filter F can be disposed between the fifth lens L5 and an imaging-plane I for filtering noises off the light rays. The filter F can be realized by an infrared ray filter (IR filter). Also, an image capture unit having photoelectric conversion function can be disposed on the imaging-plane I for receiving the light rays passing through the filter F and converting the light signals into electrical signals. A glass plate C can be disposed between the imaging-plane I and the filter F and used as a cover glass of the image capture unit.

Moreover, the optical lens OL1 satisfies the condition: TTL≤16 mm, wherein TTL refers to the distance from an object side of the first lens L1 to an imaging-plane I. Specifically, TTL refers to the distance from an apex of the first surface of the first lens L1 to an imaging-plane I. The first surface is equivalent to the lens surface S1 of Table 1 and Table 3.

Besides, the optical lens OL1 satisfies the condition: TTL/Y'≤6.1, wherein, Y' is a half-height image of the optical lens OL1.

The optical lens OL1 satisfies the condition: Y'/FL≥1.12, wherein, FL is a focal length of the optical lens OL1.

On the other hand, the optical lens OL1 further satisfies the condition: FOV=(2×ω)≥135° (degree), wherein, ω is a half field of view of Y'max, and Y'max is a maximum of a half-height image of the optical lens. In a specific embodiment, 210°≥FOV=(2×ω)≥135°.

Furthermore, the optical lens OL1 satisfies the condition: Fno≤2.4, wherein, Fno is an F-number of the optical lens OL1. In a specific embodiment, the F-number of the optical lens OL1 satisfies the condition: 1.8≤Fno≤2.4.

In another embodiment, the aperture of the optical lens OL1 adopts a design of fixed aperture.

In an embodiment, at least one of the first lens L1, the second lens L2, the third lens L3, the fourth lens L4 and the fifth lens L5 of the optical lens OL1 is an aspheric lens and/or a free-form lens, wherein, the aspheric lens has at least one aspheric surface, and the free-form lens has at least one free-form surface.

In the present embodiment, the first lens L1, the third lens L3, the fourth lens L4 and the fifth lens L5 can be realized by spherical lenses, and the the second lens L2 can be realized by an aspheric lens having at least one aspheric surface. Specifically, the aspheric surface of the second lens L2 satisfies the mathematic equation:

$$Z = \frac{CY^2}{1+\sqrt{1-(K+1)C^2Y^2}} + A_4Y^4 + A_6Y^6 + A_8Y^8 + A_{10}Y^{10} + A_{12}Y^{12}$$

where Z is the coordinate in the optical axis OA direction, and the direction in which light propagates is designated as positive; $A_4$, $A_6$, $A_8$, and $A_{10}$ are aspheric coefficients; K is coefficient of quadratic surface; C is reciprocal of R (C=1/R); R is the radius of curvature; Y is the coordinate in a direction perpendicular to the optical axis OA, in which the upward direction is designated as positive. In addition, each of the parameters or the coefficients of the equation of each of the aspheric lenses may be predetermined to determine the focal length of each of the aspheric lenses.

In another embodiment, the second lens L2 can be realized by a free-form lens having at least one free-form surface. Specifically, the second lens L2 can be realized by a free-form lens or an aspheric lens. Or, the second lens L2 can have an aspheric surface and a free-form surface at the same time, but the disclosure is not limited thereto.

Besides, in the present embodiment, the first lens L1, the third lens L3, the fourth lens L4 and the fifth lens L5 can be realized by glass lenses formed of glass, and the second lens L2 can be realized by a plastic lens formed of plastics. Examples of the plastics includes but is not limited to polycarbonate, cyclic olefin copolymer (COC such as APEL), and polyester resin (such as OKP4 or OKP4HT) or a mixed material containing at least one of the three materials disclosed above, but the present disclosure is not limited limited thereto. In another embodiment, the first lens L1, the second lens L2, the third lens L3, the fourth lens L4 and the fifth lens L5 can all be realized by glass lenses.

As indicated in FIG. 1, the first lens L1 is a convex-concave lens having a convex surface toward the object side, the second lens L2 is a convex-concave lens having a convex surface toward the object side, the third lens L3 is a biconvex lens, the fourth lens L4 is a biconvex lens, and the fifth lens L5 is a concave-convex lens having a convex surface toward the image-forming side.

In the embodiment as indicated in FIG. 1, the fourth lens L4 and the fifth lens L5 can form a doublet lens. For example, the fourth lens L4 and the fifth lens L5 can be glued to form the doublet lens.

In some embodiments as indicated in FIG. 1, the first lens L1, the second lens L2, the third lens L3, the fourth lens L4 and the fifth lens L5 respectively can move along the optical axis OA of the optical lens OL1.

Table 1 illustrates detailed information of the optical lens OL1 of FIG. 1 according to an embodiment of the present disclosure. Table 1 includes the radius of curvature, the thickness, the refractive index, and the Abbe number of each lens. The lens surface numbers are sequentially ordered from the object side to the image-forming side. For example, "S1" represents the surface of the first lens L1 facing toward the object side; "S2" represents the surface of the first lens L1 facing toward the image-forming side; "S" represents the stop surface; "S12" and "S13" respectively represent the surface of the filter F facing toward the object side and the surface of the filter F facing toward the image-forming side; "S14" and "S15" respectively represent the surface of the glass plate C facing toward the object side and the surface of the glass plate C facing toward the image-forming side. In addition, the "thickness" stands for the distance between an indicated surface and an adjacent surface close to the image-forming side. For example, the thickness of the surface S1 is the distance between the surface S1 and the surface S2, and the thickness of the surface S2 is the distance between the surface S2 and the surface S3.

TABLE 1

| Lens | Surface No. | Radius of curvature (mm) | Thickness (mm) | Refractive index nd | Abbe number vd |
|---|---|---|---|---|---|
| L1 | S1 | 14.2470 | 1.200 | 1.73 | 54.7 |
|  | S2 | 2.1033 | 1.100 |  |  |
| L2 | S3 | 3.3522 | 1.608 | 1.63 | 23.4 |
|  | S4 | 2.4726 | 0.544 |  |  |
|  | S | ∞ | 0.100 |  |  |
| L3 | S6 | 11.3807 | 3.975 | 1.88 | 40.8 |
|  | S7 | −3.5974 | 0.080 |  |  |
| L4 | S8 | 5.9336 | 1.570 | 1.76 | 52.3 |
|  | S9 | −3.4956 | 0.000 |  |  |
| L5 | S10 | −3.4956 | 1.067 | 2.0 | 19.3 |
|  | S11 | −25.9650 | 0.50 |  |  |
| F | S12 | ∞ | 0.01 |  |  |
|  | S13 | ∞ | 0.300 | 1.52 | 64.2 |
| C | S14 | ∞ | 2.000 |  |  |
|  | S15 | ∞ | 0.400 | 1.52 | 64.2 |
| I | S16 | ∞ | 0.045 |  |  |
|  | IMG | ∞ | 0.000 |  |  |

The coefficients of the aspheric mathematical expression of the two surfaces of the second lens L2 of the above embodiment, that is, "S3" and "S4", are illustrated in Table 2.

TABLE 2

|  | K | A4 | A6 | A8 | A10 |
|---|---|---|---|---|---|
| S3 | 0 | −2.6192748E−04 | 7.1600248E−05 | −3.1777018E−05 | −4.3788000E−05 |
| S4 | 0 | 9.0668609E−03 | 1.2372975E−04 | −1.4888306E−03 | 7.3356400E−04 |

Figure 2:
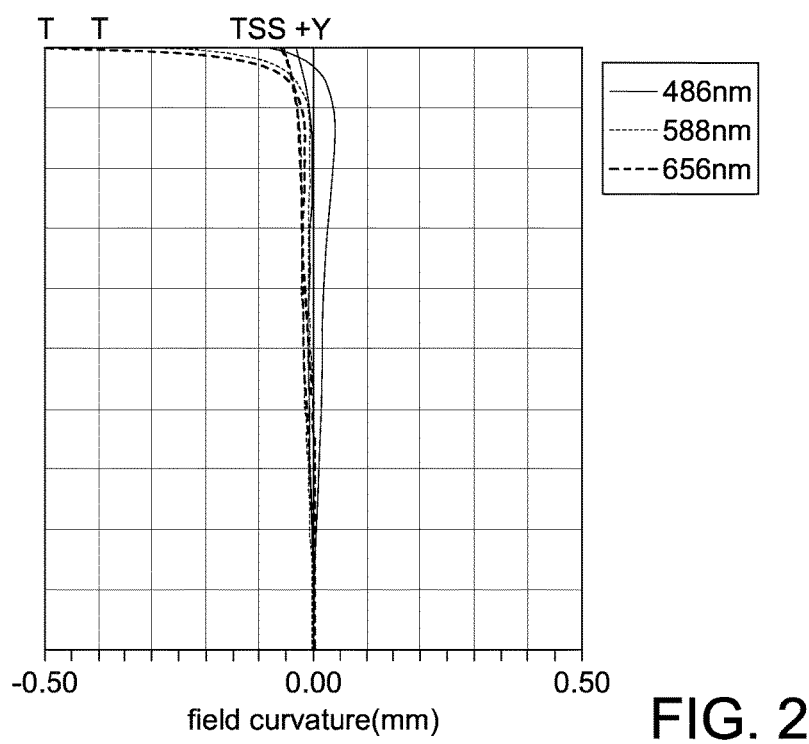
FIG. 2 is a diagram illustrating field curvature of an optical lens according to an embodiment of the present disclosure.

FIG. 2 is a diagram illustrating field curvature of an optical lens OL1 according to an embodiment of the present disclosure. The curves T and S stand for the aberration of the optical lens OL1 to the tangential rays and the sagittal rays. As shown in the drawing, the tangential values and the sagittal values of light beams with wavelengths of 486 nm, 588 nm, and 656 nm are all controlled within favorable ranges.

Figure 3:
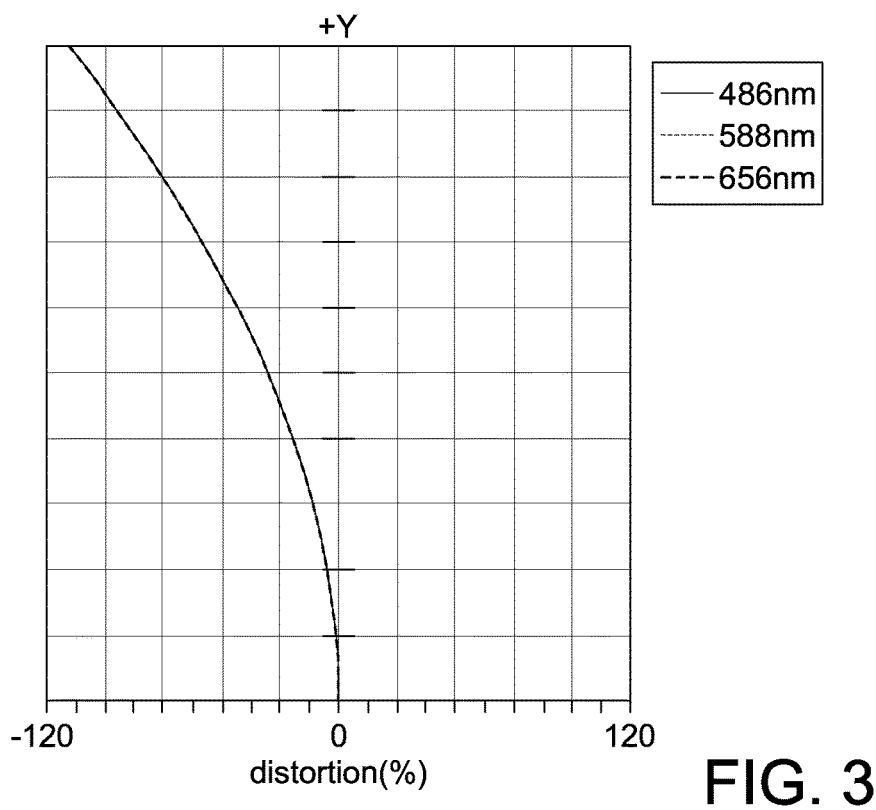
FIG. 3 is a diagram illustrating distortion of an optical lens according to an embodiment of the present disclosure.

FIG. 3 is a diagram illustrating distortion of an optical lens OL1 according to an embodiment of the present disclosure. As shown in the drawing, the distortion values for light beams with wavelengths of 486 nm, 588 nm, and 656 nm are all set in the range of (−120%, +0%).

Figure 4:
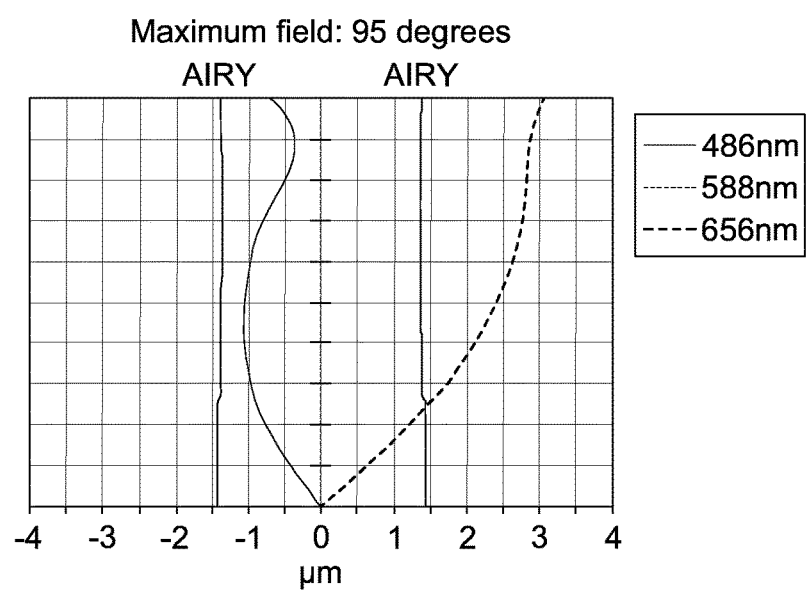
FIG. 4 is a diagram illustrating lateral color of an optical lens according to an embodiment of the present disclosure.

FIG. 4 is a diagram illustrating lateral color of an optical lens OL1 according to an embodiment of the present disclosure, wherein the lateral color can be controlled within the range of (−1.2 μm, 3.1 μm).

Figure 5:
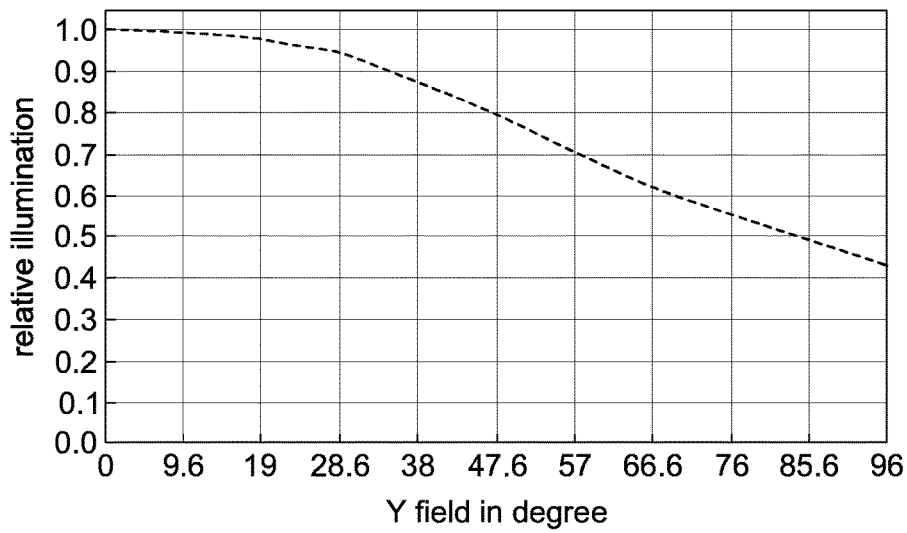
FIG. 5 is a diagram illustrating relative illumination of an optical lens according to an embodiment of the present disclosure.
Figure 6:
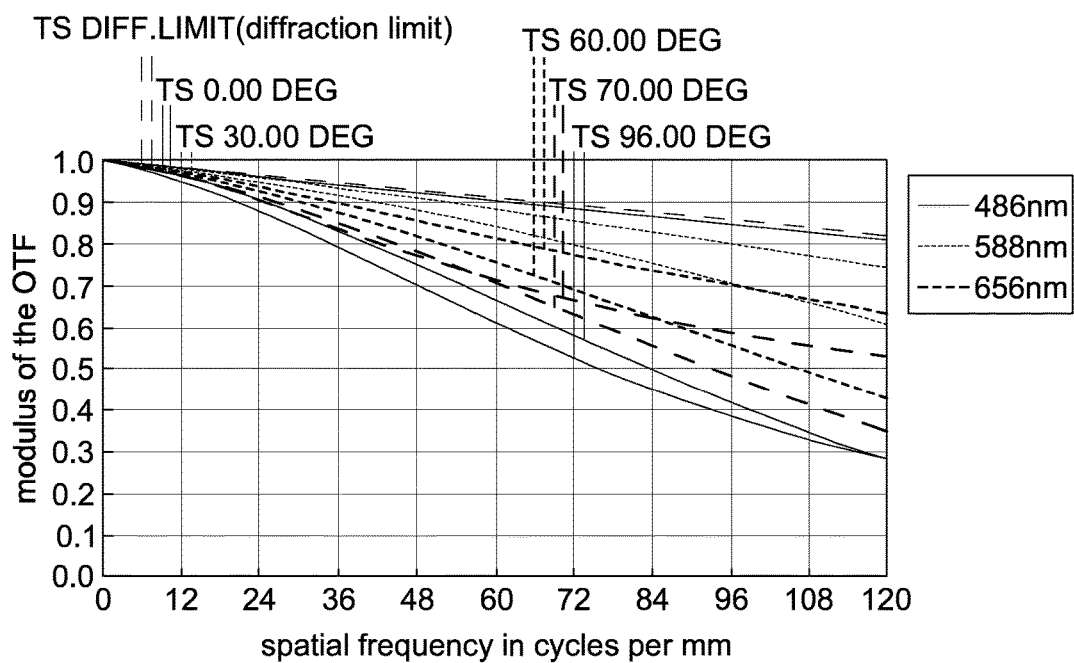
FIG. 6 is a diagram illustrating modulus of the OTF of an optical lens according to an embodiment of the present disclosure.

FIG. 5 is a diagram illustrating relative illumination of an optical lens OL1 according to an embodiment of the present disclosure. FIG. 6 is a diagram illustrating modulus of the OTF of an optical lens OL1 according to an embodiment of the present disclosure.

As indicated in FIG. 2-FIG. 6, the field curvature, distortion, lateral color, relative illumination and modulus of the OTF of the optical lens OL1 of the present embodiment are all well calibrated.

Figure 7:
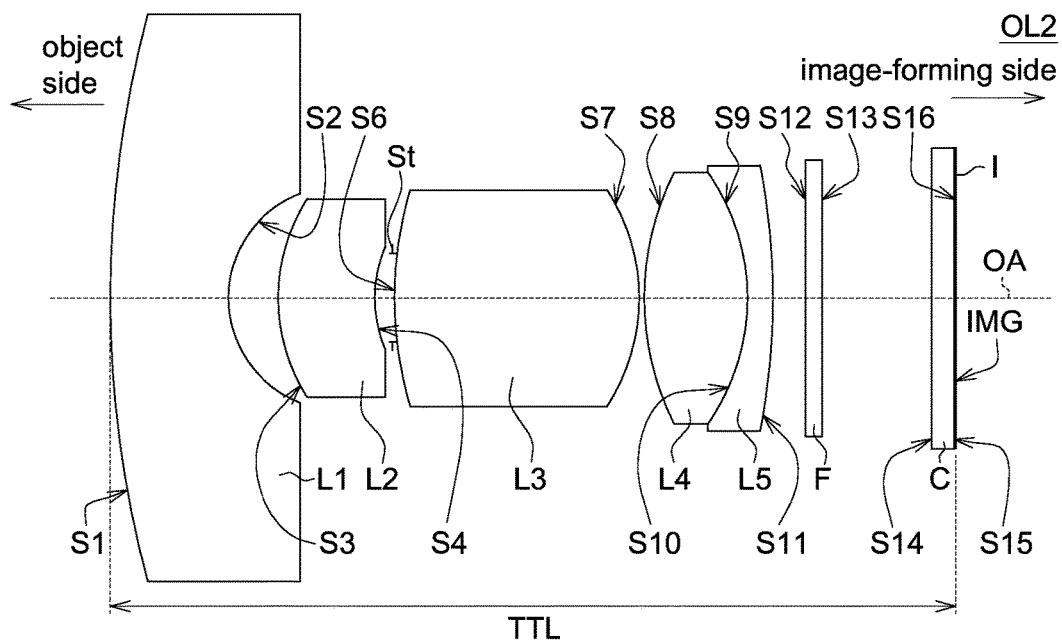
FIG. 7 is an optical lens according to another embodiment of the present disclosure.

FIG. 7 is an optical lens OL2 according to another embodiment of the present disclosure. The structure of the optical lens OL2 of the present embodiment is basically the same as that of the optical lens OL1 of FIG. 1 of previous embodiments except that the material and properties of the second lens L2 are different from that of the optical lens OL1, and the radius of curvature, the thickness, the refractive index, and the Abbe number are also different between the optical lens OL1 and the optical lens OL2. The differences are explained by an example below. As for the similarities, the descriptions disclosed above are used and are not repeated here.

In the present embodiment, the first lens L1, the second lens L2, the third lens L3, the fourth lens L4 and the fifth lens L5 of the optical lens OL2 can all be realized by spherical lenses.

On the other hand, the first lens L1, the second lens L2, the third lens L3, the fourth lens L4 and the fifth lens L5 of the optical lens OL2 can all be realized by glass lenses formed of glass.

Table 3 illustrates detailed information of the optical lens OL2 of FIG. 7 according to another embodiment of the present disclosure. Table 3 illustrates the radius of curvature, the thickness, the refractive index, and the Abbe number of each lens. The reference numerals of the present embodiment are the same as that of the previous embodiment, and are not repeated here.

TABLE 3

| Lens | Surface No. | Radius of curvature (mm) | Thickness (mm) | Refractive index nd | Abbe number vd |
|---|---|---|---|---|---|
| L1 | S1 | 19.651 | 2.15 | 1.755 | 52.3 |
|  | S2 | 1.965 | 0.91 |  |  |
| L2 | S3 | 3.439 | 1.74 | 1.73 | 28.46 |
|  | S4 | 2.278 | 0.33 |  |  |
|  | S | ∞ | 0.0.3 |  |  |
| L3 | S6 | 6.599 | 4.45 | 1.88 | 40.8 |
|  | S7 | −3.536 | 0.1 |  |  |
| L4 | S8 | 4.84 | 1.88 | 1.62 | 60.3 |
|  | S9 | −3.862 | 0 |  |  |
| L5 | S10 | −3.862 | 0.45 | 2.10 | 17.01 |
|  | S11 | −12.77 | 0.303 |  |  |
| F | S12 | ∞ | 0.30 |  |  |
|  | S13 | ∞ | 0.30 | 1.52 | 64.2 |
| C | S14 | ∞ | 2.00 |  |  |
|  | S15 | ∞ | 0.40 | 1.52 | 64.2 |
| I | S16 | ∞ | 0.05 |  |  |
|  | IMG | ∞ | 0.000 |  |  |

Figure 8:
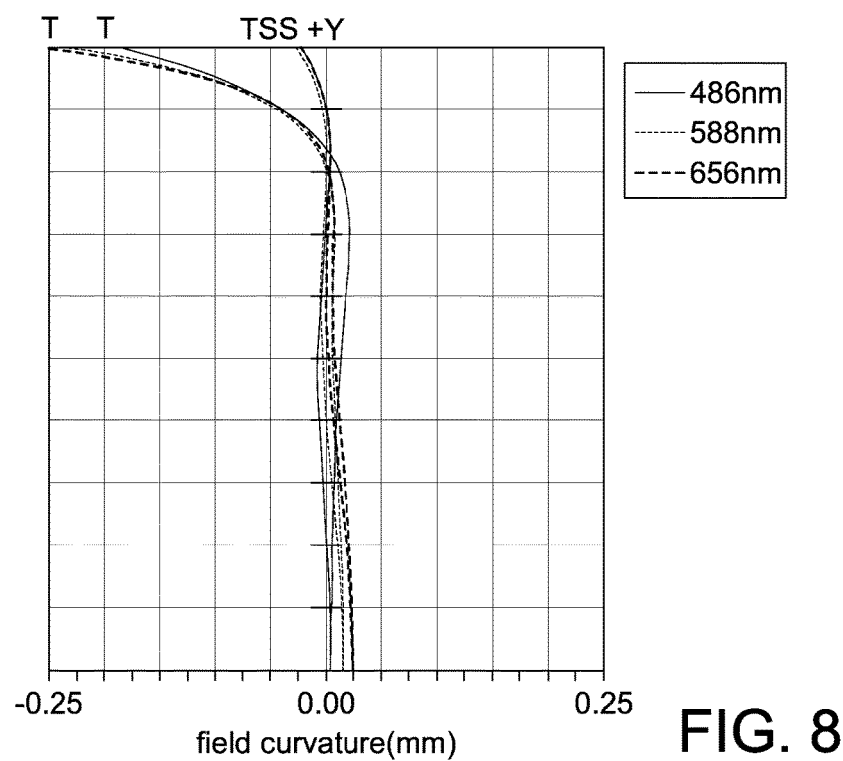
FIG. 8 is a diagram illustrating field curvature of an optical lens according to another embodiment of the present disclosure.

FIG. 8 is a diagram illustrating field curvature of an optical lens OL2 according to another embodiment of the present disclosure. The curves T and S stand for the aberration of the optical lens OL2 to the tangential rays and the sagittal rays. As shown in the drawing, the tangential values and the sagittal values of light beams with wavelengths of 486 nm, 588 nm, and 656 nm are all controlled within favorable ranges.

Figure 9:
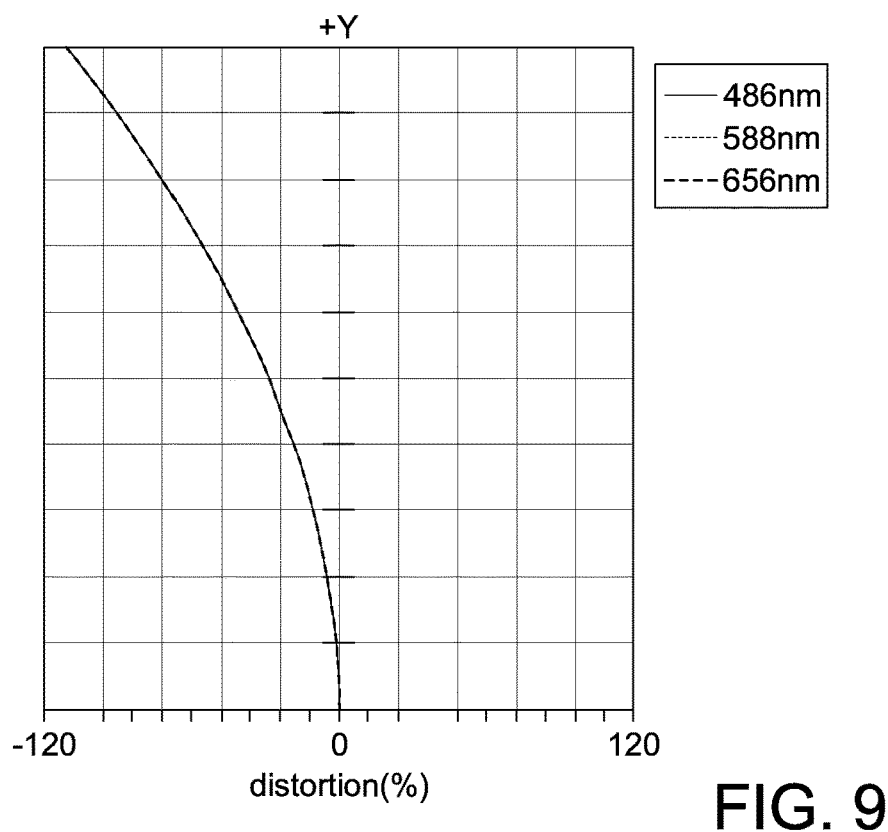
FIG. 9 is a diagram illustrating distortion of an optical lens according to another embodiment of the present disclosure.

FIG. 9 is a diagram illustrating distortion of an optical lens OL2 according to another embodiment of the present disclosure. As shown in the drawing, the distortion values for light beams with wavelengths of 486 nm, 588 nm, and 656 nm are all set in the range of (−120%, +0%).

Figure 10:
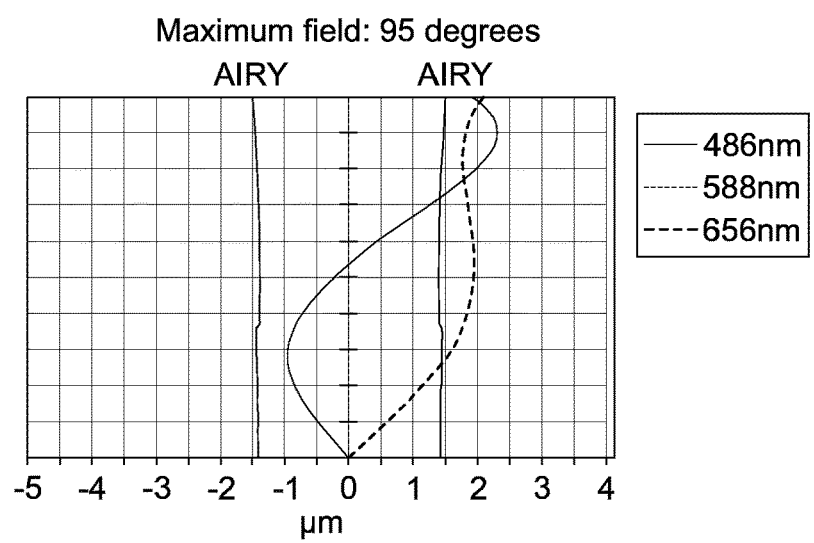
FIG. 10 is a diagram illustrating lateral color of an optical lens according to another embodiment of the present disclosure.

FIG. 10 is a diagram illustrating lateral color of an optical lens OL2 according to another embodiment of the present disclosure, wherein the lateral lateral color can be controlled within the range of (−0.9 μm, 2.3 μm).

Figure 11:
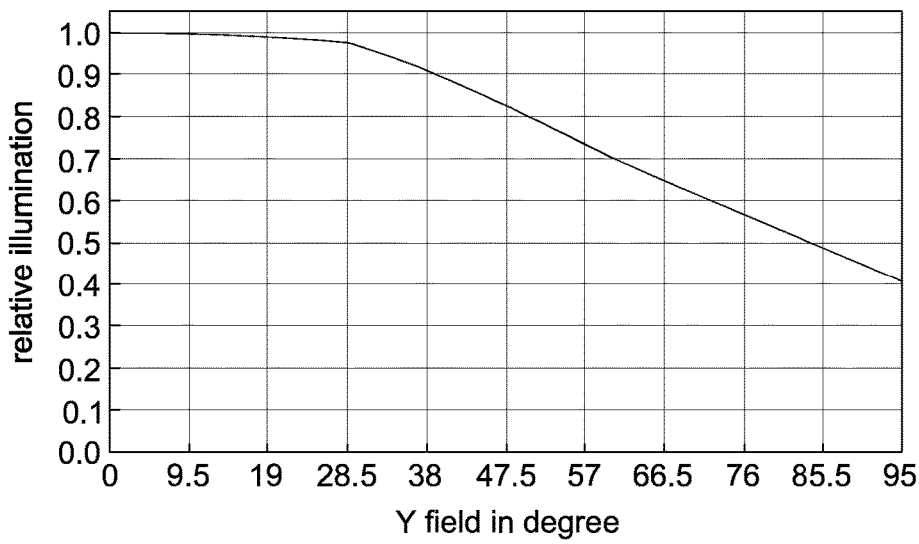
FIG. 11 is a diagram illustrating relative illumination of an optical lens according to another embodiment of the present disclosure.
Figure 12:
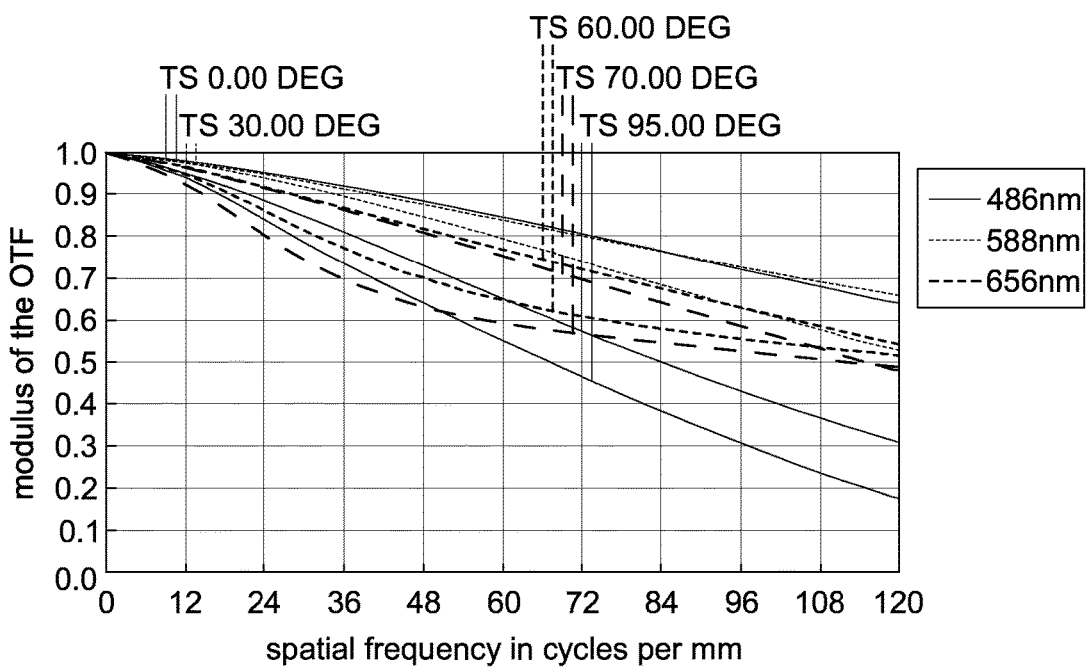
FIG. 12 is a diagram illustrating modulus of the OTF of an optical lens according to another embodiment of the present disclosure.

FIG. 11 is a diagram illustrating relative illumination of an optical lens OL2 according to another embodiment of the present disclosure. FIG. 12 is a diagram illustrating modulus of the OTF of an optical lens OL2 according to another embodiment of the present disclosure.

As indicated in FIG. 8-FIG. 12, the field curvature, distortion, lateral color aberration, relative illumination and modulus of the OTF of the optical lens OL2 of the present embodiment are all well calibrated.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical lens, in order from an object side to an image-forming side, consisting of: a first lens with negative refraction power, a second lens with negative refraction power, a third lens with refraction power, a fourth lens with positive refraction power and a fifth lens with negative refraction power, wherein the optical lens satisfies $20 \leq vd2 \leq 30$, a thickness of the third lens is larger than 3 mm and $nd5 \geq 1.9$, wherein vd2 is an Abbe number of the second lens and nd5 is a refractive index of the fifth lens.

2. The optical lens according to claim 1, wherein the second lens has a refractive index nd2, the third lens has a refractive index nd3, and $nd2 \geq 1.6$, and/or $nd3 \geq 1.8$.

3. The optical lens according to claim 1, wherein the second lens is a spherical lens, an aspheric lens or a free-form lens, and/or the third lens is a biconvex lens, a spherical lens or a biconvex spherical lens.

4. The optical lens according to claim 1, wherein the fifth lens has an Abbe number vd5, and $15 \leq vd5 \leq 25$.

5. The optical lens according to claim 1, wherein the fourth lens and the fifth lens form a doublet lens.

6. The optical lens according to claim 1, wherein the optical lens further satisfies the condition: $Y'/FL \geq 1.12$, Y' is a half image height of the optical lens, and FL is a focal length of the optical lens.

7. The optical lens according to claim 1, wherein the optical lens further satisfies the condition: $TTL \leq 16$ mm, and TTL is a distance from an object side of the first lens to an imaging plane.

8. The optical lens according to claim 1, wherein the optical lens further satisfies the condition: $TTL/Y' \leq 6.1$, TTL is a distance from an object side of the first lens to an imaging plane, and Y' is a half image height of the optical lens.

9. The optical lens according to claim 1, wherein the optical lens further satisfies the condition: $Fno \leq 2.4$, and Fno is an F-number of the optical lens.

10. The optical lens according to claim 1, wherein the optical lens further satisfies the condition: $(2 \times \omega) \geq 135°$, ω is a half field of view of Y'max, and Y'max is a maximum of a half image height of the optical lens.

11. An optical lens, in order from an object side to an image-forming side, consisting of: a first lens with negative refraction power, a second lens with negative refraction power, a third lens with refraction power, a fourth lens with positive refraction power and a fifth lens with negative refraction power, wherein the second lens has an Abbe number vd2, the second lens has a refractive index nd2, the third lens has a refractive index nd3, $20 \leq vd2 \leq 30$, a thickness of the third lens is larger than 3 mm, and the optical lens satisfies at least one of the following two conditions: $nd2 \geq 1.6$ and $nd3 \geq 1.8$.

12. The optical lens according to claim 11, wherein the fifth lens has a refractive index nd5, and $nd5 \geq 1.9$.

13. The optical lens according to claim 11, wherein the second lens is a spherical lens, an aspheric lens or a free-form lens, and/or the third lens is a biconvex lens, a spherical lens or a biconvex spherical lens.

14. The optical lens according to claim 11, wherein the fifth lens has an Abbe number vd5, and $15 \leq vd5$ and/or $vd5 \leq 25$.

15. The optical lens according to claim 11, wherein the fourth lens and the fifth lens form a doublet lens.

16. The optical lens according to claim 11, wherein the optical lens further satisfies at least one of the following conditions: $TTL \leq 16$ mm, $TTL/Y' \leq 6.1$ and $Y'/FL \geq 1.12$, TTL is a distance from an object side of the first lens to an imaging plane, Y' is a half image height of the optical lens, and FL is a focal length of the optical lens.

17. The optical lens according to claim 11, wherein the optical lens further satisfies the condition: $Fno \leq 2.4$, and Fno is an F-number of the optical lens.

18. The optical lens according to claim 11, wherein the optical lens further satisfies the condition: $(2 \times \omega) \geq 135°$, ω is a half field of view of Y'max, and Y'max is a maximum of a half image height of the optical lens.

19. An optical lens, in order from an object side to an image-forming side, consisting of: a first lens with negative refraction power, a second lens with negative refraction power, a third lens with refraction power, a fourth lens with positive refraction power and a fifth lens with negative refraction power, wherein the second lens has an Abbe number vd2, $20 \leq vd2 \leq 30$, a thickness of the third lens is larger than 3 mm, the optical lens further satisfies the condition: $Fno \leq 2.4$, and Fno is an F-number of the optical lens.

20. An optical lens, in order from an object side to an image-forming side, consisting of: a first lens with negative refraction power, a second lens with negative refraction power, a third lens with refraction power, a fourth lens with positive refraction power and a fifth lens with negative refraction power, wherein the second lens has an Abbe number vd2, $20 \leq vd2 \leq 30$, a thickness of the third lens is larger than 3 mm, the optical lens further satisfies the condition: $(2 \times \omega) \geq 135°$, ω is a half field of view of Y'max, and Y'max is a maximum of a half image height of the optical lens.

* * * * *